US012249202B2

(12) United States Patent
Shibata et al.

(10) Patent No.: US 12,249,202 B2

(45) Date of Patent: Mar. 11, 2025

(54) SHEET HANDLING DEVICE

(71) Applicant: Glory Ltd., Himeji (JP)

(72) Inventors: Shinsuke Shibata, Himeji (JP); Keisuke Nada, Himeji (JP)

(73) Assignee: GLORY LTD., Himeji (JP)

(*) Notice: Subject to any disclaimer, the term of this patent is extended or adjusted under 35 U.S.C. 154(b) by 0 days.

(21) Appl. No.: 18/380,217

(22) Filed: Oct. 16, 2023

(65) Prior Publication Data

US 2024/0062608 A1 Feb. 22, 2024

Related U.S. Application Data

(63) Continuation of application No. 16/950,941, filed on Nov. 18, 2020, now Pat. No. 11,816,945.

(30) Foreign Application Priority Data

Nov. 19, 2019 (JP) ................................ 2019-208651

(51) Int. Cl.

*G07D 11/13* (2019.01)

*G07D 11/25* (2019.01)

(52) U.S. Cl.

CPC ............ *G07D 11/13* (2019.01); *G07D 11/25* (2019.01); *G07D 2211/00* (2013.01)

(58) Field of Classification Search

CPC ..... G07D 11/13; G07D 11/25; G07D 2211/00

See application file for complete search history.

(56) References Cited

U.S. PATENT DOCUMENTS

| | | | |
|---|---|---|---|
| 7,694,953 B2 | 4/2010 | Hiramitsu et al. | |
| 8,286,963 B2 | 10/2012 | Matsumoto et al. | |
| 9,171,416 B2 | 10/2015 | Iwamura et al. | |
| 2002/0113160 A1 | 8/2002 | Niioka et al. | |
| 2013/0001040 A1* | 1/2013 | Iwamura ................ | G07D 11/30 194/206 |
| 2014/0238815 A1 | 8/2014 | Iwamura et al. | |
| 2018/0025570 A1* | 1/2018 | Nishida ................ | G07D 11/125 235/379 |
| 2022/0207949 A1 | 6/2022 | Tachibana | |

FOREIGN PATENT DOCUMENTS

| | | |
|---|---|---|
| CN | 107424288 A | 12/2017 |
| JP | 2014-085783 A | 5/2014 |
| JP | 5976497 B2 | 8/2016 |
| JP | 2017-016322 A | 1/2017 |

* cited by examiner

*Primary Examiner* — Howard J Sanders

(74) *Attorney, Agent, or Firm* — XSENSUS LLP

(57) ABSTRACT

A sheet handling device includes: a first storage; a second storage using a storage method different form that of the first storage; a transporter that transports a sheet; and a controller that controls the transporter to transport the sheet. When the second storage is neither a transport source of the sheet nor a transport destination of the sheet, the controller controls the transporter to transport the sheet at a first speed. When the second storage is at least the transport source of the sheet or the transport destination of the sheet, the controller controls the transporter to transport the sheet at a second speed lower than the first speed.

9 Claims, 9 Drawing Sheets

FIG.4

400

| | STORAGE UNITS TO BE USED | USE OF TEMPORARY STORAGE UNIT | TRANSPORT SPEED |
|---|---|---|---|
| 1 | STACK TYPE STORAGE UNITS ONLY | YES | Vf |
| 2 | TAPE TYPE STORAGE UNITS ONLY | NO/YES | Vs |
| 3 | BOTH | YES | Vs |
| 4 | STACK TYPE STORAGE UNITS (VIA TEMPORARY STORAGE UNIT, TAPE TYPE STORAGE UNITS ARE NOT USED) | TRANSPORT SOURCE → TEMPORARY STORAGE UNIT | Vf |
| | | TEMPORARY STORAGE UNIT → STACK TYPE STORGE UNITS | Vf |
| 5 | TAPE TYPE STORAGE UNITS ONLY | TRANSPORT SOURCE → TEMPORARY STORAGE UNIT | Vf |
| | | TEMPORARY STORAGE UNIT → TAPE TYPE STORAGE UNITS | Vs |
| 6 | BOTH | STORAGE SOURCE → TEMPORARY STORAGE UNIT OR TAPE TYPE STORAGE UNITS | Vs |
| | | TEMPORARY STORAGE UNIT → STACK TYPE STORGE UNITS | Vf |
| 7 | BOTH | TRANSPORT SOURCE → TEMPORARY STORAGE UNIT OR STACK TYPE STORAGE UNITS | Vf |
| | | TEMPORARY STORAGE UNIT → TAPE TYPE STORAGE UNITS | Vs |

"STACK TYPE STORAGE UNITS" INCLUDE STACK TYPE STORAGE UNITS 31 AND STACK TYPE STORAGE UNIT 32 THAT IS USED AS COLLECTION CASSETTE.

(Vf > Vs)

FIG.5

500

| | SKEW ANGLE | OFFSET | ADHESION OF ADHESIVE SUBSTANCE | OTHER REJECTION FACTORS | CENTERING OPERATION |
|---|---|---|---|---|---|
| STACK TYPE STORAGE UNITS (DEPOSIT ONLY) | LARGE | ALLOW | ALLOW | ALLOW | ALLOW |
| STACK TYPE STORAGE UNITS (RECYCLING) | LARGE | LIMITED (STRICT) | ALLOW | PROHIBIT | AMOUNT OF CENTERING: LARGE |
| TAPE TYPE STORAGE UNITS | SMALL | LIMITED (LOOSE) | PROHIBIT STORAGE | PARTLY ALLOW | AMOUNT OF CENTERING: SMALL |
| COLLECTION CASSETTE | LARGE | ALLOW | ALLOW | ALLOW | ALLOW |

FIG.8

| TEMPLATE FILE FOR RECOGNITION | BANKNOTE INFORMATION | | | |
|---|---|---|---|---|
| | BANKNOTE FEATURES | WHETHER BANKNOTES CAN BE STORED IN TAPE TYPE STORAGE UNITS | WHETHER BANKNOTES CAN BE STORED IN MIXED STATE | MAXIMUM NUMBER OF BANKNOTES |

10

SHEET HANDLING DEVICE

CROSS-REFERENCE TO RELATED APPLICATIONS

The present application is a continuation of U.S. application Ser. No. 16/950,941, filed on Nov. 18, 2020, which claims priority to Japanese Patent Application No. 2019-208651 filed on Nov. 19, 2019, the entire disclosures of each are incorporated by reference herein.

BACKGROUND

The technique discloses herein relates to sheet handling devices.

Japanese Unexamined Patent Publication No. 2017-16322 describes a banknote handling device. A temporary storage unit of this banknote handling device is of a stack type. The stack type temporary storage unit stores banknotes by stacking them in the vertical direction. This temporary storage unit changes the speed at which it feeds out the banknotes (feeding speed). Specifically, in the case where the path from the temporary storage unit to a transport destination of the banknotes is the same and it is not necessary to change the transport destination by switching of the gates, the temporary storage unit increases the feeding speed of the banknotes. Since the feeding speed is high, the interval between the banknotes being transported on the transport path is small. The temporary storage unit otherwise reduces the feeding speed of the banknotes. Since the feeding speed is low, the interval between the banknotes being transported on the transport path is large.

In a banknote handling device described in Japanese Unexamined Patent Publication No. 2014-085783, a tape type storage unit changes the feeding speed of banknotes. The tape type storage unit stores banknotes by winding the banknotes together with a tape around a drum. When the banknote handling device performs a dispense process, the storage unit changes the feeding speed of the banknotes to a speed lower than the transport speed of the banknotes. The interval between the banknotes being transported on a transport path is larger than that between the banknotes stored in the storage unit. In other words, the tape type storage unit stores the banknotes with reduced intervals therebetween. This increases the maximum storage capacity of the storage unit.

When the banknote handling device performs a reconciliation process, the storage unit makes the feeding speed of the banknotes equal to the transport speed of the banknotes. The interval between the banknotes being transported on the transport path is therefore the same as that between the banknotes stored in the storage unit. In the case where the feeding speed of the storage unit is different from the transport speed of a transport unit, the skew of the banknotes may be increased when the storage unit feeds out the banknotes. The skew of the banknotes will not be increased when the feeding speed of the storage unit is equal to the transport speed of the transport unit.

SUMMARY

The sheet handling device described in Japanese Unexamined Patent Publication No. 2017-16322 includes a stack type storage unit. The sheet handling device described in Japanese Unexamined Patent Publication No. 2014-085783 includes a tape type storage unit. In the sheet handling device described in Japanese Unexamined Patent Publication No. 2017-16322, banknotes are transported at such a speed that they can be appropriately stored in the stack type storage unit. In the sheet handling device described in Japanese Unexamined Patent Publication No. 2014-085783, banknotes are transported at such a speed that they can be appropriately stored in the tape type storage unit. The transport speed of sheet handling devices including a tape type storage unit is typically lower than that of sheet handling devices including a stack type storage unit.

When sheets are transported at a low speed, it takes longer to handle them. The conventional sheet handling devices therefore have room for improvement in terms of handling efficiency.

The technique disclosed herein improves sheet handling efficiency.

The technique disclosed herein relates to a sheet handling device. The sheet handling device includes: a first storage unit that stores a sheet; a second storage unit that stores the sheet by a method different from a method by which the first storage unit stores the sheet; a transport unit configured to transport the sheet inside the sheet handling device; and a control unit that controls the transport unit to transport the sheet. When the second storage unit is neither a transport source of the sheet nor a transport destination of the sheet, the control unit controls the transport unit to transport the sheet at a first speed. When the second storage unit is at least the transport source of the sheet or the transport destination of the sheet, the control unit controls the transport unit to transport the sheet at a second speed lower than the first speed.

Since the control unit changes the transport speed of the transport unit, handling efficiency of the sheet handling device is improved.

The second storage unit may include a tape type storage unit that stores the sheet by winding the sheet together with a tape around a drum. When storing a plurality of the sheets in the tape type storage unit, the control unit may control the tape type storage unit to change a winding speed of the tape and the sheets based on the transport of the sheets at the second speed.

With this configuration, the interval between the sheets that are wound on the drum can be reduced. The maximum storage capacity of the second storage unit is thus increased.

The first storage unit may include a stack type storage unit that stores the sheets by stacking the sheets in a vertical direction or arranging the sheets in a horizontal direction, and the stack type storage unit and the tape type storage unit may be disposed in a safe unit.

Since the safe unit protects first storage unit and the second storage unit, security of the sheet handling device is improved.

The first storage unit may include a temporary storage unit, the temporary storage storing the sheets and feeding out the stored sheets, and the temporary storage unit may be disposed outside the safe unit.

Disposing the temporary storage unit outside the safe unit facilitates user's access to the temporary storage unit in case of an error.

The control unit may perform a process of controlling the transport unit to store the sheets taken into the sheet handling device in at least the tape type storage unit or the stack type storage unit. When performing the process in a first mode, the control unit may control the transport unit to transport the sheets to be stored in the tape type storage unit to the tape type storage unit at the second speed. When performing the process in the first mode, the control unit may control the transport unit to transport the sheets to be stored in the stack type storage unit to the temporary storage unit at the second speed before transporting the sheets to the stack type storage unit. The temporary storage unit may store the sheets to be stored in the stack type storage unit.

Since the transport speed of the sheets is the second speed, the tape type storage unit and/or the temporary storage unit can appropriately store the sheets. The tape type storage unit and/or the temporary storage unit can also feed out the stored sheets. The sheets taken into the sheet handling device can be returned.

After all the sheets to be stored in the stack type storage unit are stored in the temporary storage unit, the control unit may control the temporary storage unit to feed out the sheets stored in the temporary storage unit to the transport unit. The control unit may control the transport unit to transport the sheets fed out of the temporary storage unit to the stack type storage unit at the first speed.

The sheets are thus quickly transported from the temporary storage unit to the stack type storage unit, and the stack type storage unit can appropriately store the sheets.

The control unit may perform the process of controlling the transport unit to store the sheets taken into the sheet handling device in at least the tape type storage unit or the stack type storage unit. When performing the process in a second mode, the control unit may control the transport unit to transport the sheets to be stored in the tape type storage unit to the temporary storage unit at the first speed before transporting the sheets to the tape type storage unit. When performing the process in the second mode, the control unit may control the transport unit to transport the sheets to be stored in the stack type storage unit to the stack type storage unit at the first speed. The temporary storage unit may store the sheets to be stored in the tape type storage unit.

Since the transport speed of the sheets is the first speed, the time it takes to perform the process is reduced. Moreover, the temporary storage unit and/or the stack type storage unit can appropriately store the sheets.

After all the sheets to be stored in the tape type storage unit are stored in the temporary storage unit, the control unit may control the temporary storage unit to feed out the sheets stored in the temporary storage unit to the transport unit. The control unit may control the transport unit to transport the sheets fed out of the temporary storage unit to the tape type storage unit at the second speed.

Since the transport speed of the sheets is the second speed, the tape type storage unit can appropriately store the sheets.

BRIEF DESCRIPTION OF THE DRAWINGS

FIG. 4 illustrates a setting example of the transport speed of banknotes;

FIG. 5 illustrates an example of setting conditions under which each storage unit allows storage of banknotes;

FIG. 8 illustrates a file structure related to update of the sheet handling device.

DETAILED DESCRIPTION

An embodiment of a sheet handling device will be described with reference to the accompanying drawings. The sheet handling device described herein is illustrated by way of example only.

Figure 9:
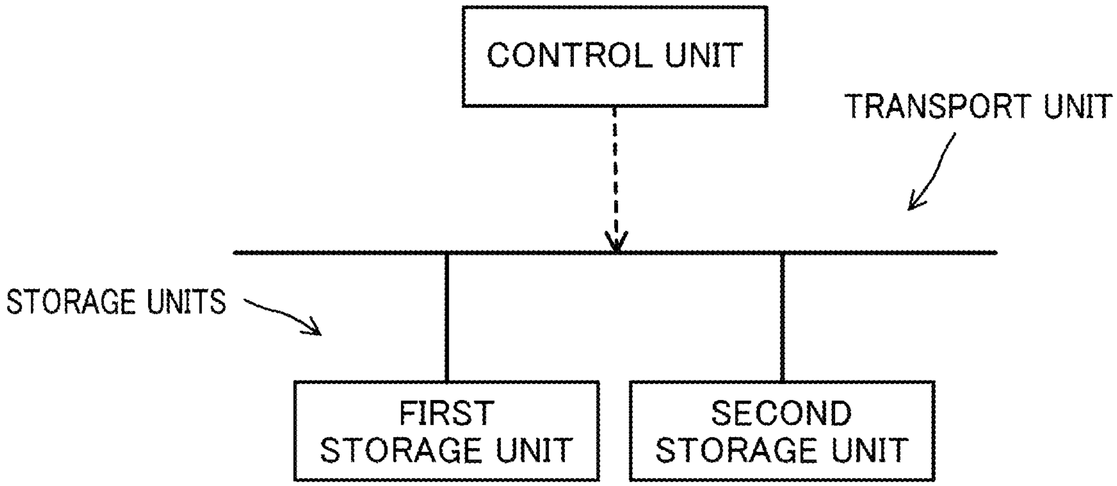
FIG. 9 illustrates the configuration of a sheet handling device.

FIG. 9 illustrates a sheet handling device. The sheet handling device includes a first storage unit that stores sheets, a second storage unit that stores sheets by a method different from that of the first storage unit, a transport unit configured to transport sheets within the sheet handling device, and a control unit that controls the transport unit to transport the sheets.

When the second storage unit is neither a transport source nor a transport destination of the sheets, the control unit controls the transport unit to transport the sheets at a first speed. When the second storage unit is either or both of a transport source and a transport destination of the sheets, the control unit controls the transport unit to transport the sheets at a second speed lower than the first speed. Since the control unit changes the transport speed of the transport unit, the handling efficiency of the sheet handling device is improved.

Figure 1:
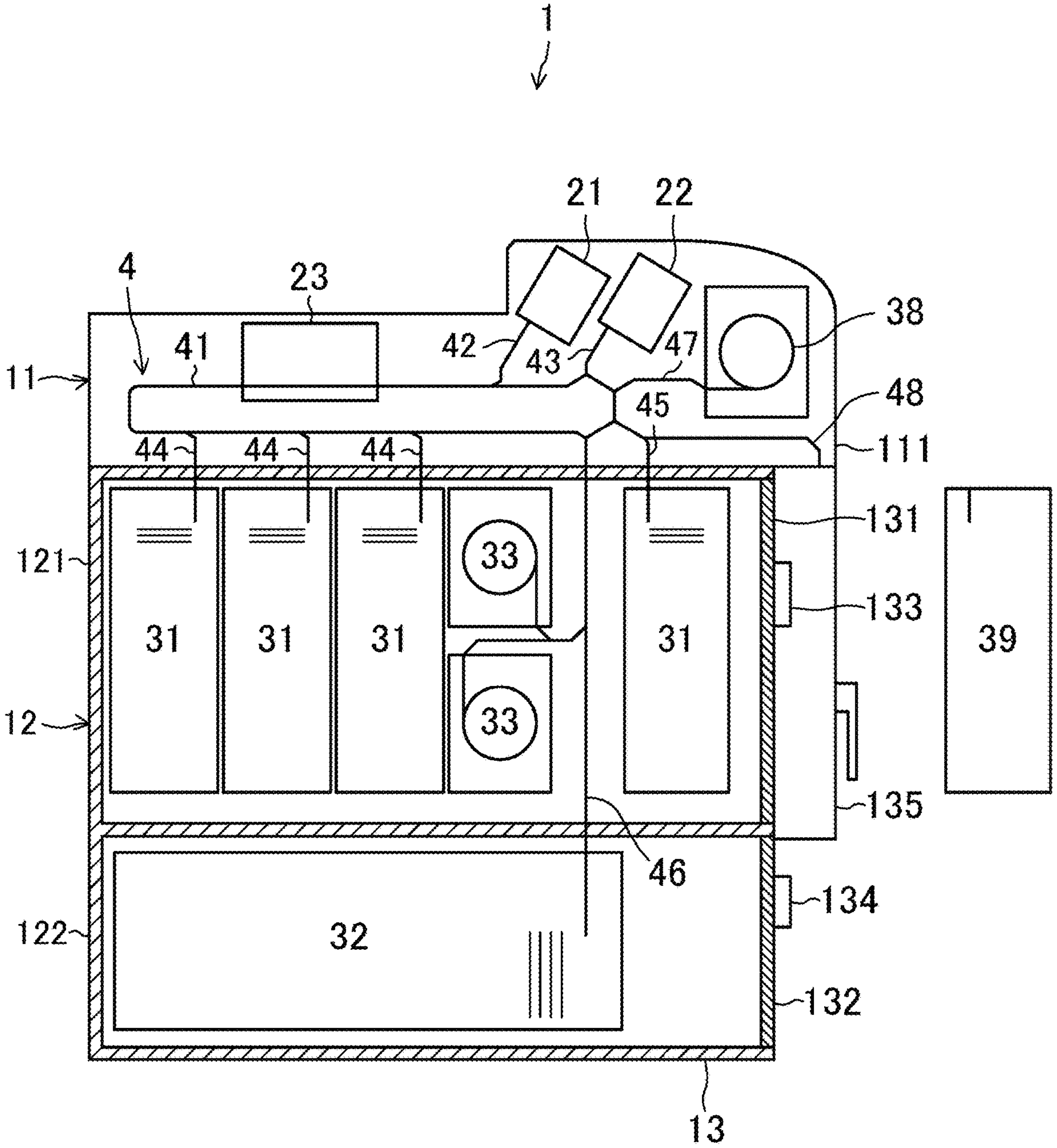
FIG. 1 illustrates an internal configuration of a sheet handling device.

FIG. 1 illustrates a banknote handling device 1 as a second configuration example of the sheet handling device of FIG. 9. The banknote handling device 1 is installed in financial institutions such as banks. For example, the banknote handling device 1 can also be installed in back offices of retail stores. The banknote handling device 1 performs processes related to banknotes.

General Configuration of Banknote Handling Device

FIG. 1 illustrates the internal structure of the banknote handling device 1. In the following description, the side of the banknote handling device 1 on which a first door 131, which will be described later, is located is sometimes referred to as the front, and the opposite side of the banknote handling device 1 from the side on which the first door 131 is located is sometimes referred to as the rear.

The banknote handling device 1 transports and handles banknotes one by one. The banknote handling device 1 includes a handling unit 11 located in the upper part of the banknote handling device 1 and a safe unit 12 located in the lower part of the banknote handling device 1. The safe unit 12 includes a first safe unit 121 and a second safe unit 122.

The handling unit 11 has an upper housing 111. A deposit unit 21, a dispense unit 22, a recognition unit 23, and a part of a transport path are disposed in the upper housing 111.

The safe unit 12 has a safe housing 13. The safe housing 13 is divided into two parts. Storage units and a part of the transport path are disposed in the safe housing 13. The safe housing 13 protects the storage units at a predetermined security level or higher. Specifically, the safe housing 13 is made of a metal plate with a predetermined thickness or more. The security level of the safe housing 13 is therefore higher than that of the upper housing 111.

The safe housing 13 has the first door 131 and a second door 132. The first door 131 has an electronic lock 133. The first door 131 opens when a user unlocks the electronic lock 133. Although not shown in the figure, when the first door 131 is opened, the user can pull out the storage unit in the first safe unit 121 forward.

The second door 132 also has an electronic lock 134. The second door 132 opens when the user unlocks the electronic lock 134. When the second door 132 is opened, the user can pull out the storage unit in the second safe unit 122 forward.

A person who can unlock the electronic lock 133 is a specially authorized person. A person who can unlock the electronic lock 134 also a specially authorized person. The person who can unlock the electronic lock 133 and the person who can unlock the electronic lock 134 are not necessarily the same.

The deposit unit 21 is a portion into which banknotes to be deposited are placed in a process such as a deposit process. The user manually places banknotes into the deposit unit 21. The deposit unit 21 holds a plurality of banknotes in a stacked state. The deposit unit 21 has a mechanism that takes banknotes one by one into the banknote handling device 1.

The dispense unit 22 is a portion that holds dispensed banknotes in a process such as a dispense process. The dispense unit 22 can be used for various purposes. The dispense unit 22 holds a plurality of banknotes in a stacked state. The user can manually take the banknotes out of the dispense unit 22.

The recognition unit 23 is disposed on a transport path 41 that will be described later. In the example of FIG. 1, the transport path 41 is a looped path. Although the looped transport path 41 is shown in the example of FIG. 1, the transport path 41 may not be a looped path. The recognition unit 23 recognizes at least the authenticity, denominations, and fitness of banknotes by detecting the banknotes being transported on the transport path 41 and acquiring an image of each banknote. The recognition unit 23 also acquires the serial numbers of the banknotes.

The recognition unit 23 also recognizes abnormal transport of the banknotes. Abnormal transport means that banknotes are not being transported in a predetermined normal state. Examples of the abnormal transport include skewed notes, chained notes, and overlapping notes. The skewed notes are banknotes skewed at an angle larger than a predetermined allowable angle with respect to the transport direction. The chained notes are banknotes with an interval smaller than an allowable interval therebetween. The overlapping notes are two or more banknotes at least partially overlapping each other.

The storage units include storage units 31, 32, and 33. There are a total of seven storage units in the example of FIG. 1. The banknote handling device 1 has the first, second, third, and fourth stack type storage units 31. The stack type storage units 31 store banknotes by stacking them in the vertical direction. The stack type storage units 31 are storage cassettes that are detachable from the banknote handling device 1. The stack type storage units 31 can feed out the stored banknotes. The first, second, and third stack type storage units 31 are disposed next to each other in the longitudinal direction of the banknote handling device 1 at rear positions in the first safe unit 121. For example, the first, second, and third stack type storage units 31 store banknotes by denomination. The fourth stack type storage unit 31 is disposed at a front position in the first safe unit 121. For example, the fourth stack type storage unit 31 can be a reconciliation cassette that is used in a reconciliation process. The fourth stack type storage unit 31 can also be a multipurpose storage unit. The fourth stack type storage unit 31 can be used for various purposes.

The stack type storage unit 32 stores banknotes by arranging them in the horizontal direction. The stack type storage unit 32 is configured to store banknotes, but is not configured to feed out the stored banknotes. The stack type storage unit 32 is disposed in the second safe unit 122. The user can take the stack type storage unit 32 out of the second safe unit 122. For example, the stack type storage unit 32 disposed in the second safe unit 122 in the lower part of the banknote handling device 1 can be used as a collection cassette. That is, the collection cassette 32 is a stack type storage unit. In the following description, the stack type storage unit 32 is sometimes referred to as the collection cassette 32.

The tape type storage units 33 store banknotes by winding the banknotes together with a tape around a drum. The tape type storage units 33 are different from the stack type storage units 31, 32 in the way they stores banknotes. The banknote handling device 1 has the first and second tape type storage units 33. The tape type storage units 33 are storage units that are detachable from the banknote handling device 1. The tape type storage units 33 can feed out the stored banknotes. The first and second tape type storage units 33 are disposed between the first stack type storage unit 31 and the second stack type storage unit 31 in the longitudinal direction of the banknote handling device 1. The first and second tape type storage units 33 are disposed next to each other in the vertical direction.

A known configuration can be used as appropriate for the stack type storage units 31, 32. A known configuration can also be used as appropriate for the tape type storage units 33. The number of storage units, the configuration of the storage units, and the arrangement of the storage units in the banknote handling device 1 are not limited to the number, configuration, and arrangement described above.

A transport unit 4 transports banknotes within the banknote handling device 1. The transport unit 4 has a transport path. Although not shown in the figure, the transport path is composed of a combination of a large number of rollers, a plurality of belts, a motor for driving the rollers and the belts, and a plurality of guides. For example, the transport unit 4 transports banknotes one by one on the transport path with their long edges facing in the transport direction with an interval between the banknotes. The transport unit 4 may transport banknotes with their short edges facing in the transport direction. The long edge is a concept indicating the longer side of a rectangular banknote, and the short edge is a concept indicating the shorter side of a rectangular banknote.

The transport unit 4 has the looped transport path 41 and connection paths 42 to 48 connected to the transport path 41. In the banknote handling device 1 illustrated in FIG. 1, the transport path is composed of the transport path 41 and the connection paths 42 to 48.

The transport path 41 is provided in the upper housing 111. The transport unit 4 transports banknotes on the transport path 41 in the clockwise and counterclockwise directions in FIG. 1.

The deposit unit 21 is connected to the transport path 41 via the connection path 42. The dispense unit 22 is connected to the transport path 41 via the connection path 43.

The first, second, and third stack type storage units 31 are connected to the transport path 41 via the connection paths 44. Each of the three connection paths 44 extends in both the handling unit 11 and the first safe unit 121 in the vertical direction. The transport unit 4 transports banknotes to each of the first, second, and third stack type storage units 31 or transports banknotes from each of the first, second, and third stack type storage units 31.

Similarly, the fourth stack type storage unit 31 is connected to the transport path 41 via the connection path 45. The transport unit 4 transports banknotes to the fourth stack type storage unit 31 or transports banknotes from the fourth stack type storage unit 31.

The connection path 46 extends in the vertical direction. The handling unit 11 and the first safe unit 121 are connected to each other via the connection path 46. The first safe unit 121 and the second safe unit 122 are connected to each other via the connection path 46. The first safe unit 121 is provided between the handling unit 11 and the second safe unit 122 in the vertical direction. The first and second tape type storage units 33 are connected to the transport path 41 via the connection path 46. The connection path 46 diverges in the region of the first safe unit 121. The first and second tape type storage units 33 are connected to branch paths of the connection path 46. The transport unit 4 transports banknotes to each of the first and second tape type storage units 33 or transports banknotes from each of the first and second tape type storage units 33. The collection cassette 32 is connected to the transport path 41 via the connection path 46.

Although not shown in the figure, diverter mechanisms that divert banknotes are provided at the connection points between the transport path 41 and the connection paths 42, 43, 44, 45, 46. A diverter mechanism is also provided at the diverging point of the connection path 46.

Passage sensors 49 (see FIGS. 3 and 7) that detect passage of banknotes are disposed at various locations on the transport path 41 and the connection paths 42, 43, 44, 45, 46. The transport unit 4 receives commands from a control unit 15 that will be described later and controls each diverter mechanism based on detection signals of the passage sensors 49 to transport banknotes to a predetermined transport destination.

The banknote handling device 1 has a temporary storage unit 38 in the upper housing 111. The temporary storage unit 38 temporarily stores banknotes to be deposited in a process such as the deposit process. The temporary storage unit 38 can be used for various purposes. The temporary storage unit 38 is disposed at a front position in the upper housing 111. The temporary storage unit 38 is connected to the transport path 41 via the connection path 47. Although not shown in the figure, a diverter mechanism that diverts banknotes is provided at the connection point between the transport path 41 and the connection path 47. The temporary storage unit 38 is a tape type storage unit. A known configuration can be used as appropriate for the temporary storage unit 38. The storage method of the temporary storage unit 38 is the same as or substantially the same as that of the tape type storage units 33. As will be described later, however, the transport unit 4 transports banknotes at a higher speed when feeding them into the temporary storage unit 38 and when feeding them out of the temporary storage unit 38 than when feeding them into the tape type storage units 33 and when feeding them out of the tape type storage units 33. The storage method (control method) of the temporary storage unit 38 is different from that of the tape type storage units 33 in this regard.

Figure 2:
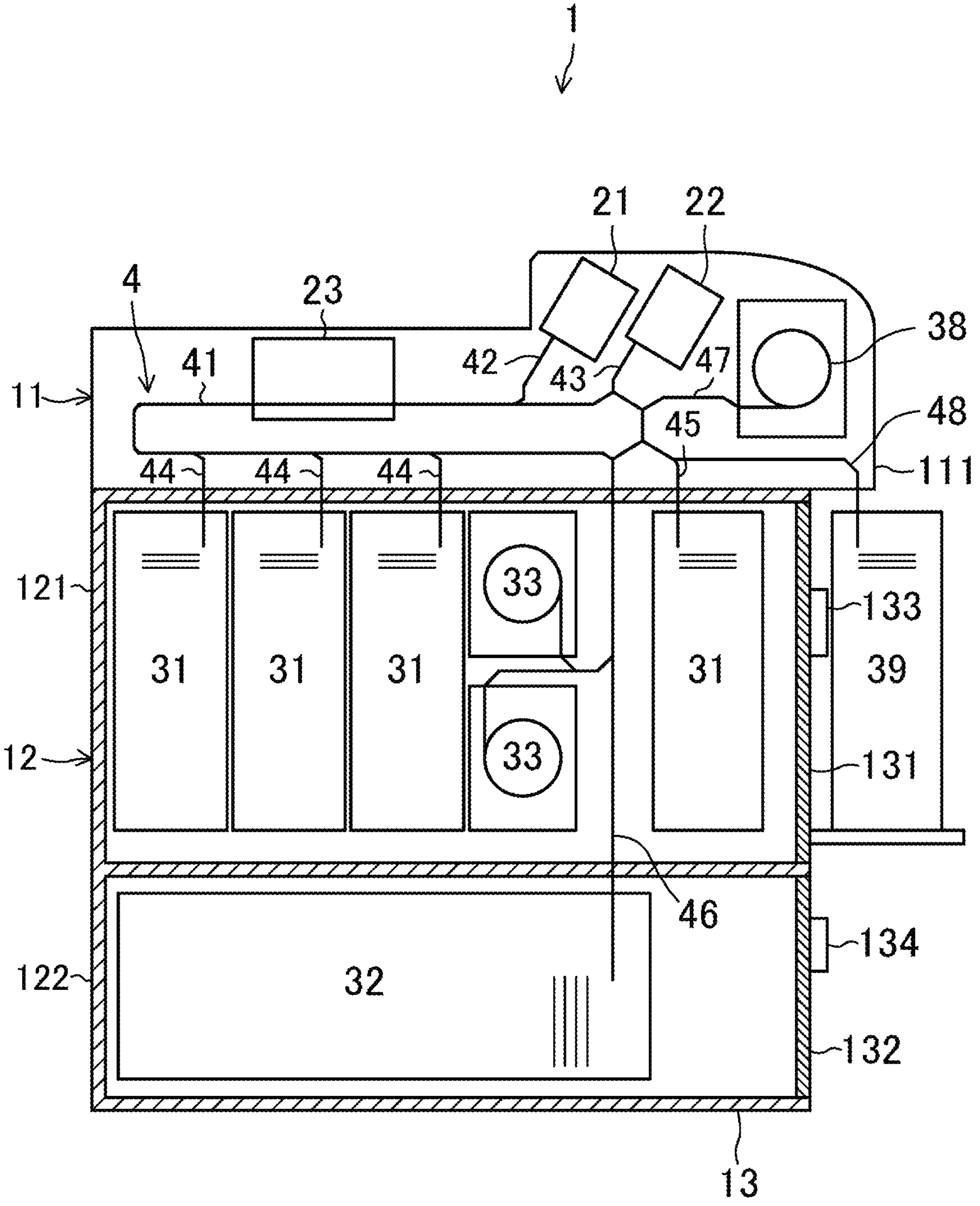
FIG. 2 illustrates the sheet handling device with a secure transfer cassette attached thereto.

As shown in FIGS. 1 and 2, a secure transfer cassette (STC) 39 can be attached to the banknote handling device 1 and can be detached from the banknote handling device 1. The STC 39 is a detachable storage unit. The STC 39 is a stack type storage unit. A known configuration can be used as appropriate for the STC 39.

The banknote handling device 1 has a cover 135. The cover 135 is attached to the safe housing 13 so as to cover the first door 131. The position of the cover 135 can be changed to the position where the cover 135 covers the first door 131 as shown in FIG. 1 or the position where the cover 135 does not cover the first door 131, which is not shown in the figure.

The user opens the cover 135 when attaching the STC 39 to the banknote handling device 1. The user does not open the first door 131 at this time. FIG. 2 illustrates the banknote handling device 1 with the cover 135 opened. The opened cover 135 is not shown in FIG. 2. The STC 39 is placed in front of the first door 131 when attached to the banknote handling device 1. The STC 39 is connected to the transport path 41 via the connection path 48.

Figure 3:
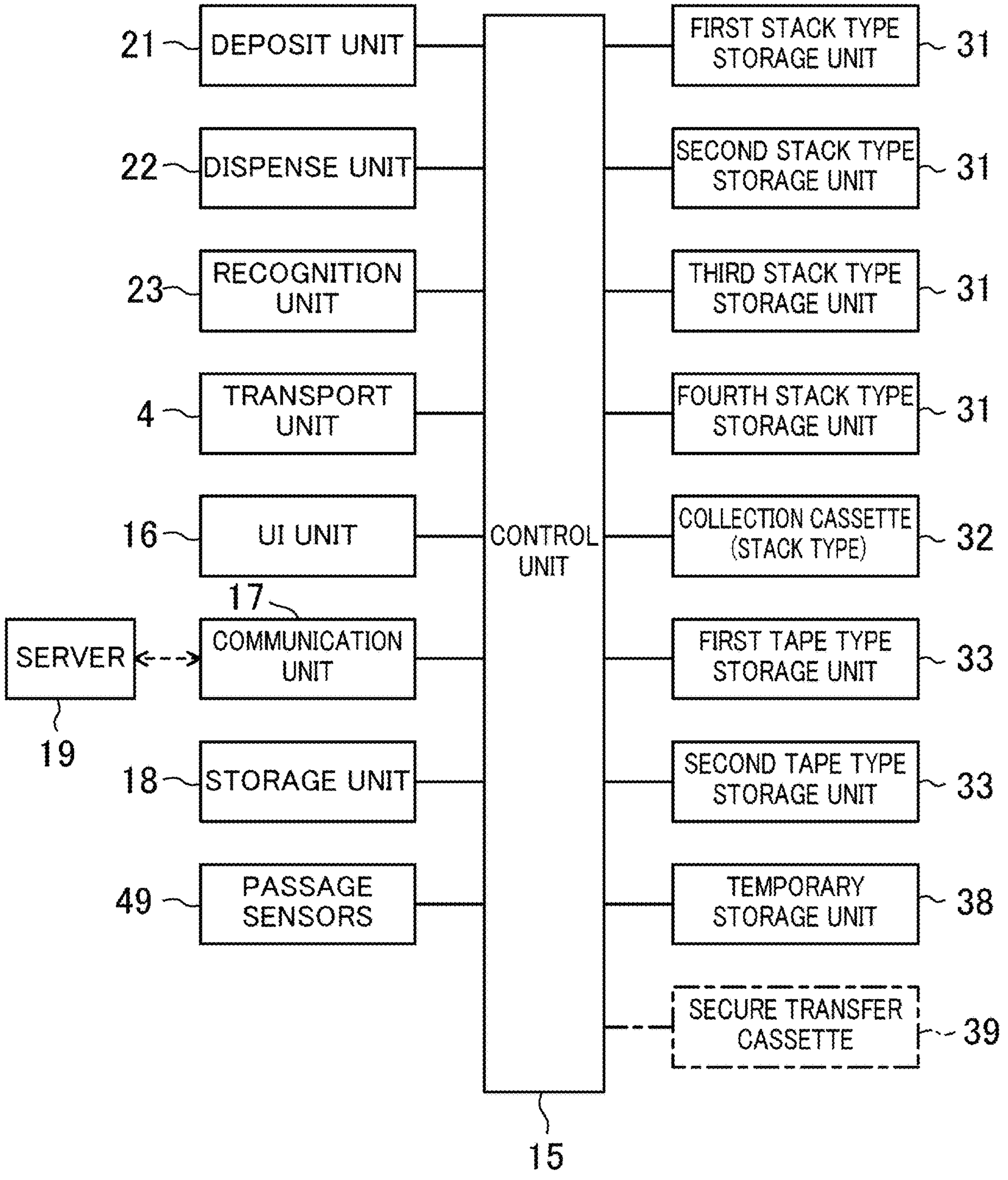
FIG. 3 is a block diagram illustrating the configuration of the sheet handling device.

FIG. 3 is a block diagram illustrating the configuration of the banknote handling device 1. The banknote handling device 1 includes the control unit 15. The deposit unit 21, the dispense unit 22, the recognition unit 23, the transport unit 4, the storage units 31, 32, 33, and the temporary storage unit 38 are connected to the control unit 15 so that signals can be sent between these units and the control unit 15.

When the STC 39 is attached to the banknote handling device 1, the STC 39 is also connected to the control unit 15 so that signals can be sent therebetween.

The banknote handling device 1 has a user interface (UI) unit 16 that is an interface to the user, a communication unit 17 for communicating with a server 19, and a storage unit 18 for storing various kinds of data etc. The UI unit 16, the communication unit 17, and the storage unit 18 are also connected to the control unit 15 so that signals can be sent between these units and the control unit 15. For example, the UI unit 16 may be a touch panel display device. The UI unit 16 includes an output unit that outputs various sounds. The "sounds" as used herein include voice.

For example, when the user instructs to perform a process via the UI unit 16, the control unit 15 outputs signals to the deposit unit 21, the dispense unit 22, the recognition unit 23, the transport unit 4, and the storage units 31, 32, 33, the temporary storage unit 38, and the STC 39 so as to perform the process according to the instruction.

How the banknote handling device 1 operates when performing processes will be briefly described. Each unit operates as described below based on signals from the control unit 15.

Deposit Process

The user places banknotes to be deposited into the deposit unit 21. The deposit unit 21 takes the banknotes one by one into the banknote handling device 1. The transport unit 4 transports the banknotes to the recognition unit 23. The recognition unit 23 recognizes the banknotes. The transport unit 4 transports the banknotes having passed through the recognition unit 23 to the temporary storage unit 38. The temporary storage unit 38 stores the banknotes.

The transport unit 4 also transports any banknote recognized as a reject note by the recognition unit 23 to the dispense unit 22. The transport unit 4 also transports any banknote determined to be a reject note after passing through the recognition unit 23 to the dispense unit 22. The user places the banknotes returned to the dispense unit 22 back into the deposit unit 21. The banknotes thus placed back into the deposit unit 21 by the user are taken back into the banknote handling device 1.

When all the banknotes placed into the deposit unit 21 are taken into the banknote handling device 1, the UI unit 16 displays the deposit amount. When the user operates the UI unit 16 to confirm the deposit process, the temporary storage unit 38 feeds out the stored banknotes. The transport unit 4 transports each of the banknotes fed out of the temporary storage unit 38 to a desired one of the storage units 31, 32, and 33. The storage units 31, 32, and 33 thus store the banknotes. The deposit process ends when the storage units 31, 32, and 33 store the banknotes. The storage unit 18 stores information on the banknotes stored in the storage units 31, 32, and 33.

In the deposit process, the transport unit 4 may directly transport the banknotes from the deposit unit 21 to the storage units 31, 32, and 33, and the storage units 31, 32, and 33 may store the banknotes. In other words, the temporary storage unit 38 may not be used in the deposit process.

Withdrawal Process

The storage units 31, 33 feed out banknotes to be withdrawn in a withdrawal process. The transport unit 4 transports the banknotes to the recognition unit 23. The recognition unit 23 recognizes the banknotes. The transport unit 4 transports the recognized banknotes to the dispense unit 22.

The transport unit 4 transports any banknote recognized as a reject note by the recognition unit 23 to the collection cassette 32. The collection cassette 32 stores the banknotes rejected in the withdrawal process. In the case where the fourth stack type storage unit 31 is a multipurpose storage unit, the reject notes may be stored in the fourth stack type storage unit 31.

The withdrawal process ends when all the banknotes to be withdrawn are stacked in the dispense unit 22. The storage unit 18 erases information on the banknotes dispensed to the dispense unit 22.

Replenishment Process

A replenishment process is a process of replenishing the storage units 31, 33 with banknotes. The replenishment process is performed in a manner similar to that of the deposit process. The user places banknotes for replenishment into the deposit unit 21. The deposit unit 21 takes the banknotes one by one into the banknote handling device 1. The transport unit 4 transports the banknotes to the recognition unit 23. The recognition unit 23 recognizes the banknotes. The transport unit 4 transports the banknotes having passed through the recognition unit 23 to the storage units 31, 33. The storage units 31, 33 store the banknotes. The replenishment process ends when all the banknotes placed into the deposit unit 21 are stored in the storage units 31, 33. The storage unit 18 stores information on the banknotes stored in the storage units 31, 33.

The user may use the STC 39 in the replenishment process. In this case, the user stores banknotes for replenishment in the STC 39 and attaches the STC 39 to the banknote handling device 1. The STC 39 feeds out the banknotes one by one, and the banknotes fed out of the STC 39 are taken into the banknote handling device 1. The storage units 31, 33 store the recognized banknotes. The replenishment process ends when all the banknotes in the STC 39 are stored in the storage units 31, 33. The storage unit 18 stores information on the banknotes stored in the storage units 31, 33.

Collection Process

A collection process is a process of collecting banknotes stored in the storage units 31, 33. The storage units 31, 33 feed out banknotes to be collected in the collection process. The transport unit 4 transports the banknotes to the recognition unit 23. The recognition unit 23 recognizes the banknotes. The transport unit 4 transports the recognized banknotes to the collection cassette 32. The collection cassette 32 stores the banknotes.

When all the banknotes to be collected are stored in the collection cassette 32, a person in charge of, e.g., security transportation unlocks the electronic lock 134 and opens the second door 132. The person in charge of security transportation takes the collection cassette 32 out of the second safe unit 122. The person in charge of security transportation collects the banknotes to be collected together with the collection cassette 32. The storage unit 18 erases information on the collected banknotes.

The person in charge of security transportation may use the STC 39 in the collection process. In this case, the person in charge of security transportation attaches the empty STC 39 to the banknote handling device 1. The transport unit 4 transports the recognized banknotes to the STC 39. The STC 39 stores the banknotes. When all the banknotes to be collected are stored in the STC 39, the person in charge of security transportation detaches the STC 39 from the banknote handling device 1. The person in charge of security transportation collects the banknotes to be collected together with the STC 39. The storage unit 18 erases information on the collected banknotes.

Reconciliation Process

The reconciliation process is a checking process of checking banknotes stored in the storage units 31, 33. When the first, second and third stack type storage units 31 are to be reconciliated, the reconciliation process is performed using the fourth stack type storage unit 31 or the STC 39. When the fourth stack type storage unit 31 is to be reconciliated, the reconciliation process is performed using the STC 39. When the tape type storage units 33 are to be reconciliated, the reconciliation process is performed using the temporary storage unit 38.

The storage units 31, 33 to be reconciliated feed out the stored banknotes. The transport unit 4 transports the banknotes to the recognition unit 23. The recognition unit 23 recognizes the banknotes. The transport unit 4 transports the recognized banknotes to the fourth stack type storage unit 31, the STC 39, or the temporary storage unit 38. The fourth stack type storage unit 31, the STC 39, or the temporary storage unit 38 stores the banknotes.

After the storage units 31, 33 to be reconciliated finishes feeding out the banknotes, the fourth stack type storage unit 31, the STC 39, or the temporary storage unit 38 feeds out the stored banknotes. The transport unit 4 transports the banknotes to the recognition unit 23. The recognition unit 23 recognizes the banknotes again. The transport unit 4 transports the recognized banknotes back to their original storage units 31, 33. The storage units 31, 33 store the banknotes. The reconciliation process ends when all the banknotes are stored back in the storage units 31, 33. The storage unit 18 stores information on the banknotes stored in the storage units 31, 33, based on the reconciliation results. In the above example, in the reconciliation process, the banknotes are transported from the storage unit 31 (33) to the temporary storage unit 38 via the recognition unit 23 and are transported from the temporary storage unit 38 back to the storage unit 31 (33) via the recognition unit 23. That is, the recognition unit 23 recognizes the banknotes twice in the reconciliation process. The recognition unit 23 may recognize the banknotes only once in the reconciliation process.

Setting of Banknote Transport Speed

The banknote handling device 1 includes the stack type storage units 31, 32 and the tape type storage units 33. The stack type storage unit and the tape type storage unit are different from each other in characteristics, and it is preferable to use the stack type storage unit or the tape type storage unit depending on the application.

Advantages of the stack type storage units 31, 32 will be described. The storage capacity of the stack type storage unit 31 (32) is larger than that of the tape type storage unit 33. When storing banknotes, the banknotes can be transported at a higher transport speed to the stack type storage units 31, 32 than to the tape type storage unit 33. This is because the stack type storage units 31, 32 store banknotes by merely staking them and do not require winding control that is performed by the tape type storage unit 33. The winding control will be described later.

Advantages of the tape type storage unit 33 will be described. The order of banknotes does not change between when they are stored in the tape type storage unit 33 and when they are fed out of the tape type storage unit 33. Before the use of the stack type storage unit 31, the position of a banknote restraining unit (not shown) in the stack type storage unit 31 typically needs to be adjusted according to the denomination (size) of banknotes to be stored therein. On the other hand, the tape type storage unit 33 can store banknotes of a plurality of denominations without adjustment of the tape type storage unit 33. The tape type storage unit 33 is typically more compact than the stack type storage unit 31. Since the number of storage units can therefore be increased, the banknote handling device 1 including the tape type storage units 33 can handle a larger number of denominations.

Since the banknote handling device 1 is of a hybrid type including both the stack type storage units 31, 32 and the tape type storage units 33, the banknote handling device 1 can handle banknotes by taking advantage of both the stack type storage units 31, 32 and the tape type storage units 33.

As described above, when storing banknotes, the banknotes are transported at a lower transport speed to the tape type storage units 33 than to the stack type storage units 31, 32. The tape type storage units 33 intermittently winds the tape around the drum (i.e., the winding control) in order to increase their storage capacity. The term "intermittently" herein means that the tape type storage unit 33 temporarily stops winding the tape before storing the next banknote after winding the tape to store a banknote. Since the winding speed of the tape and the banknote is changed based on transport of banknotes, the tape type storage unit 33 has a characteristic that the transport speed of banknotes cannot be increased when storing them in the tape type storage unit 33.

In a banknote handling device including both the stack type storage units 31, 32 and the tape type storage units 33, banknote handling efficiency decreases if the transport speed of banknotes is always set (fixed) to a low speed so as to adapt to the tape type storage units 33. Accordingly, the banknote handling device 1 changes the transport speed of banknotes. More specifically, when handling banknotes, the banknote handling device 1 changes the transport speed according to the storage unit to be used to perform the process (the storage unit to be used to handle banknotes). With this configuration, handling efficiency is improved, and banknotes are also appropriately stored in the storage units.

FIG. 4 illustrates a setting example 400 of the transport speed of banknotes by the banknote handling device 1. First to seven cases are different in combination of the storage units and the temporary storage unit 38 to be used to perform a process. The transport speeds Vf, Vs shown in FIG. 4 have the following relationship: Vf (first speed Vf)>Vs (second speed Vs). The first to seventh cases will be described below.

The first case is the case where the stack type storage units 31, 32 are transport sources or transport destinations of banknotes and the temporary storage unit 38 is not used. Examples of the first case include: a deposit process in which banknotes are transported from the deposit unit 21 directly to the first, second, third, and fourth stack type storage units 31 and the collection cassette 32; a replenishment process in which the first, second, and third stack type storage units 31 are replenished with banknotes; a withdrawal process in which banknotes are fed out of the first, second, and third stack type storage units 31; a collection process in which banknotes are collected from the first, second, third, and fourth stack type storage units 31; and a reconciliation process for the first, second, third, and fourth stack type storage units 31. As described above, the fourth stack type storage unit 31 or the STC 39 is used in the reconciliation process. In the first case, the control unit 15 controls the transport unit 4 to set the transport speed to the first speed Vf. The first speed Vf is higher than the second speed Vs that will be described later (Vf>Vs). By setting the transport speed to the first speed Vf in the process in which only the stack type storage units are used, the time it takes to perform the process is reduced, and handling efficiency is improved.

The second case is the case where the tape type storage units 33 are transport destinations or transport sources of banknotes and the temporary storage unit 38 is either not used or used. Examples of the second case include: a despite process in which banknotes are transported from the deposit unit 21 directly to the first and second tape type storage units 33; a replenishment process in which the first and second tape type storage units 33 are replenished with banknotes; a withdrawal process in which banknotes are fed out of the first and second tape type storage units 33; a collection process in which banknotes are collected from the first and second tape type storage units 33; and a reconciliation process for the first and second tape type storage units 33. As described above, the temporary storage unit 38 is used in the reconciliation process. In the second case, the control unit 15 sets the transport speed to the second speed Vs. The second speed Vs is lower than the first speed Vf. By setting the transport speed to the second speed Vs, banknotes can be appropriately stored in the first and second tape type storage units 33 and can be appropriately fed out of the first and second tape type storage units 33.

The third case is the case where both the stack type storage units 31, 32 and the tape type storage units 33 are transport destinations or transport sources of banknotes and the temporary storage unit 38 is not used. Examples of the third case include: a deposit process in which banknotes are transported from the deposit unit 21 directly to the first, second, third, and fourth stack type storage units 31, the collection cassette 32 (stack type storage unit), and the first and second tape type storage units 33; a replenishment process in which the first, second, and third stack type storage units 31 and the first and second tape type storage units 33 are replenished with banknotes; a withdrawal process in which banknotes are fed out of the first, second, and third stack type storage units 31 and the first and second tape type storage units 33; and a collection process in which banknotes are collected from the first, second, third, and fourth stack type storage units 31 and the first and second tape type storage units 33. In the third case, the control unit 15 sets the transport speed to the second speed Vs. Banknotes can thus be appropriately stored in the tape type storage units 33 and can be appropriately fed out of the tape type storage units 33. Banknotes can also be appropriately stored in the stack type storage units 31, 32 and can be appropriately fed out of the stack type storage units 31, 32.

The fourth case is the case where the stack type storage units 31, 32 are transport destinations of banknotes and the temporary storage unit 38 is used. An example of the fourth case is a deposit process in which banknotes to be stored in the first, second, third, and fourth stack type storage units 31 and the collection cassette 32 (stack type storage unit) are first stored in the temporary storage unit 38 and then transported to the first, second, third, and fourth stack type storage units 31 and the collection cassette 32. Banknotes to be stored in the first, second, third, and fourth stack type storage units 31 and the collection cassette 32 are transported to the desired storage units via the temporary storage unit 38. In other words, the fourth case is the case where the tape type storage units 33 are not used.

As described above, the temporary storage unit 38 has a configuration similar to that of the tape type storage unit. However, it is not necessary to increase the storage capacity of the temporary storage unit 38. Accordingly, unlike the tape type storage units 33, it is not necessary to reduce the transport speed when storing banknotes in the temporary storage unit 38. In other words, the temporary storage unit 38 can be configured not to perform such winding control as described above, and can use a control method different from that of the tape type storage units 33. In the fourth case, the control unit 15 controls the transport unit 4 to set the transport speed from a transport source such as the deposit unit 21 to the temporary storage unit 38 to the first speed Vf. The control unit 15 sets the transport speed from the temporary storage unit 38 to the first, second, third and fourth stack type storage units 31 and the collection cassette 32 to the first speed Vf. Since the transport speed is high, the time it takes to perform the process is reduced, and handling efficiency of the banknote handling device 1 is improved.

The fifth case is the case where the tape type storage units 33 are transport destinations of banknotes and the temporary storage unit 38 is used. An example of the fifth case is a deposit process in which banknotes to be stored in the first and second tape type storage units 33 are first stored in the temporary storage unit 38 and then transported to the first and second tape type storage units 33. In other words, the fifth case is the case where the stack type storage units 31, 32 are not used. In the fifth case, the control unit 15 controls the transport unit 4 to set the transport speed from a transport source such as the deposit unit 21 to the temporary storage unit 38 to the first speed Vf. The time it takes to perform the process is thus reduced, and handling efficiency is improved. The control unit 15 also controls the transport unit 4 to set the transport speed from the temporary storage unit 38 to the first and second tape type storage units 33 to the second speed Vs. The first and second tape type storage units 33 can thus appropriately store banknotes. The first and second tape type storage units 33 also have an increased storage capacity.

The sixth case is the case related to a deposit process. In the sixth case, banknotes to be stored in the stack type storage units 31, 32 out of banknotes to be deposited are stored in the stack type storage units 31, 32 via the temporary storage unit 38. Banknotes to be stored in the tape type storage units 33 out of the banknotes to be deposited are stored in the tape type storage units 33 without using the temporary storage unit 38. More specifically, the banknotes to be stored in the first, second, third and fourth stack type storage units 31 and the collection cassette 32 are first transported to the temporary storage unit 38 and stored therein, and then transported from the temporary storage unit 38 to the first, second, third and fourth stack type storage units 31 and the collection cassette 32. The banknotes to be stored in the first and second tape type storage units 33 are transported from the deposit unit 21 directly to the first and second tape type storage units 33 and stored therein without using the temporary storage unit 38. The banknotes to be deposited are thus temporarily stored in the tape type storage units 33 or the temporary storage unit 38. The tape type storage units 33 and the temporary storage unit 38 can feed out the stored banknotes in the same order as that the banknotes are stored therein. In the case where the deposit process is not confirmed by the user's operation and the banknotes to be deposited are returned to the user, the banknotes taken into the banknote handling device 1 for the deposit process themselves can be fed out of the tape type storage units 33 or the temporary storage unit 38.

In the sixth case, the control unit 15 sets the transport speed to the second speed Vs and controls the transport unit 4 when transporting banknotes from a transport source to the temporary storage unit 38 or the first and second tape type storage units 33. The banknotes to be deposited are appropriately stored in the temporary storage unit 38 or the first and second tape type storage units 33. The control unit 15 sets the transport speed to the first speed Vf and controls the transport unit 4 when transporting banknotes from the temporary storage unit 38 to the first, second, third and fourth stack type storage units 31 and the collection cassette 32 after the deposit process is confirmed. The banknotes can thus be quickly transported to the stack type storage units 31, 32 and stored therein.

The seventh case is also the case related to a deposit process. Contrary to the sixth case, in the seventh case, banknotes to be stored in the tape type storage units 33 out of banknotes to be deposited are stored in the tape type storage units 33 via the temporary storage unit 38. Banknotes to be stored in the stack type storage units 31, 32 out of the banknotes to be deposited are stored in the stack type storage units 31, 32 without using the temporary storage unit 38. More specifically, the banknotes to be stored in the first and second tape type storage units 33 are first transported to the temporary storage unit 38 and stored therein, and then transported from the temporary storage unit 38 to the first and second tape type storage units 33. The banknotes to be stored in the first, second, third, and fourth stack type storage units 31 and the collection cassette 32 are transported directly to the first, second, third, and fourth stack type storage units 31 and the collection cassette 32 and stored therein without using the temporary storage unit 38. The banknotes to be deposited are thus transported to the temporary storage unit 38 or the stack type storage units 31, 32. The control unit 15 can therefore increase the transport speed to the first speed Vf. Since the transport speed is high, the banknotes can be quickly transported to the temporary storage unit 38 or the stack type storage units 31, 32. The time from the start of the deposit process to confirmation of the deposit process is thus reduced.

In the seventh case, the control unit 15 sets the transport speed to the second speed Vs when transporting the banknotes from the temporary storage unit 38 to the first and second tape type storage units 33. This transportation of the banknotes is performed after the deposit process is confirmed. Accordingly, even when it takes long to transport the banknotes from the temporary storage unit 38 to the first and second tape type storage units 33, it does not cause much inconvenience.

When the user instructs to perform a deposit process, the user need only designate either the sixth case or the seventh case. The user may set either the sixth case or the seventh case as the default for the banknote handling device 1.

As described above, the control unit 15 of the banknote handling device 1 switches the transport speed between the first speed Vf and the second speed Vs according to the storage unit to be used to perform the process. With this configuration, the handling efficiency of the banknote handling device 1 is improved, and banknotes are also appropriately stored in the storage units.

Setting of Conditions Under which Storage Units Allow Storage of Banknotes

As described above, the banknote handling device 1 includes the stack type storage units 31, 32 and the tape type storage units 33. The stack type storage units 31, 32 and the tape type storage unit 33 use different storage methods. Since the storage method of the stack type storage units 31, 32 is different from that of the tape type storage unit 33, the conditions under which the stack type storage units 31, 32 cannot store banknotes are different from the conditions under which the tape type storage units 33 cannot store banknotes. If the conditions under which the stack type storage units 31, 32 cannot store banknotes and the conditions under which the tape type storage units 33 cannot store banknotes are the same in the banknote handling device 1, the number of reject notes may increase.

The banknote handling device 1 may therefore be configured so that it can set different conditions under which the storage unit allows storage of banknotes for each storage unit. An example of setting different conditions for each storage unit will be described with reference to FIG. 5.

FIG. 5 illustrates conditions 500 set for each storage unit. FIG. 5 illustrates the following five conditions.

Skew angle: the magnitude of the skew angle of a banknote being transported on the transport path with respect to the transport direction Offset: the amount by which a banknote being transported is offset in the lateral direction of the transport path. The width direction of the transport path is a direction perpendicular to the transport direction.

Adhesion of adhesive substance: a banknote has an adhesive substance such as an adhesive tape thereon.

Other rejection factors: factors other than the skew angle, offset, and adhesion of an adhesive substance described above.

Centering operation: Although not shown in the figures, this is the condition in the case where a centering mechanism is disposed on the transport path. The centering mechanism is a mechanism for centering a banknote with respect to the center of the transport path.

Skew Angle

A banknote with a too large skew angle is regarded as a reject note and will not be stored in the storage unit. The stack type storage units 31 allow storage of banknotes even with large skew angles. This is because the stack type storage units 31 can store and feed out banknotes with large skew angles. The collection cassette 32 also allows storage of banknotes even when the banknotes have large skew angles. This is because the collection cassette 32 can store even banknotes with large skew angles and does not feed out banknotes. The magnitude of the skew angle can be determined by the recognition unit 23. The magnitude of the skew angle can also be determined based on the detection signals of the passage sensors 49, in addition to being determined by the recognition unit 23.

The tape type storage units 33 allow storage of banknotes with smaller skew angles than the stack type storage units 31. The tape type storage units 33 do not store banknotes with large skew angles. The tape type storage units 33 reject banknotes with large skew angles out of the banknotes to be stored in the tape type storage unit 33.

Offset

The conditions under which the stack type storage units 31 allow storage of banknotes is different between when banknotes stored therein are fed out in a process such as a withdrawal process for use (i.e., the stack type storage units 31 are recycling storage units) and when banknotes stored therein are not fed out (i.e., the stack type storage units 31 are deposit only storage units).

Figure 6:
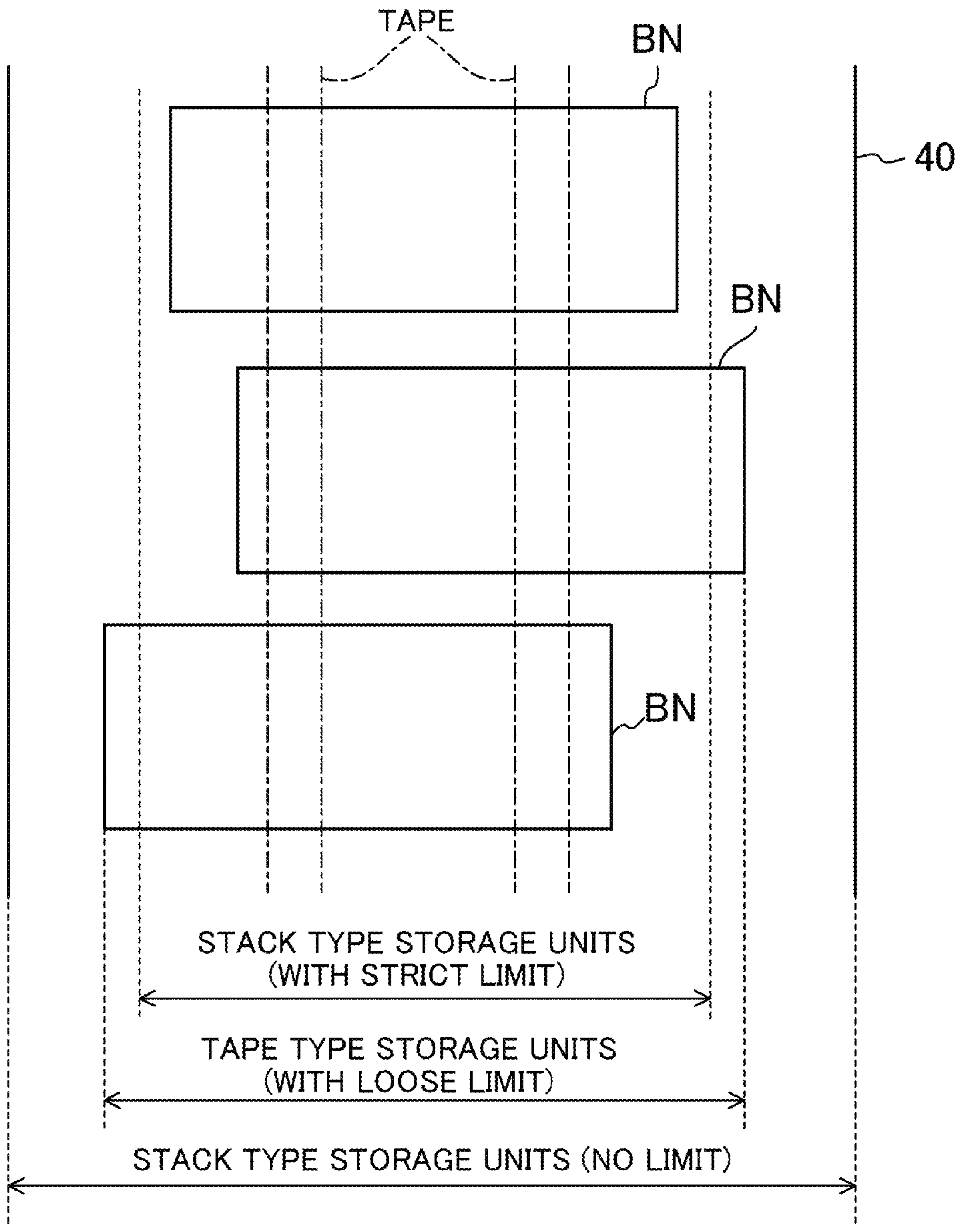
FIG. 6 illustrates limits on offset of banknotes.

The deposit only storage units 31 and the deposit only collection cassette 32 allow storage of banknotes even when their offset is large. On the other hand, the recycling stack type storage units 31 have a limit on the offset of banknotes. The tape type storage units 33 also have a limit on the offset of banknotes. FIG. 6 illustrates the amount of offset of a banknote that will be prohibited from being stored in the tape type storage units 33.

FIG. 6 illustrates banknotes BN being transported on a transport path 40. The interval between the banknotes BN in FIG. 6 is narrower than the actual interval. Each tape type storage unit 33 has at least one tape. Long dashed and short dashed lines in FIG. 6 represent imaginary positions of two tapes in the tape type storage unit 33. In order for the tape type storage unit 33 to store the banknotes BN, the banknotes BN need to overlap the tapes. If the offset of the banknote BN is large, the banknote BN does not overlap the tapes. Accordingly, the tape type storage unit 33 has a limit on the offset of banknotes according to the positions of the tapes. As will be described later, this limit is relatively loose. When the offset of a banknote to be stored in the tape type storage unit 33 is larger than the limit, this banknote will be rejected. The amount of offset can be determined based on the signal of the recognition unit 23. The amount of offset can also be determined based on the detection signals of the passage sensors 49, in addition to being determined by the recognition unit 23.

As described above, the deposit only stack type storage units 31 and the deposit only collection cassette 32 do not have a limit on the offset of banknotes. Banknotes to be stored in the deposit only stack type storage units 31 and the deposit only collection cassette 32 will not be rejected even when their offset is large.

As described above, in the recycling stack type storage units 31, the banknote restraining unit is adjusted according to the denomination (size) of banknotes to be stored therein. The banknote restraining unit is a guide for preventing the stacked banknotes from sliding on top of each other from moving. The recycling stack type storage units 31 have a limit on the offset of banknotes according to the position of the banknote restraining unit. In order to reduce contact between the banknotes and the banknote restraining unit, the recycling stack type storage units 31 have a stricter limit on the offset of banknotes than the tape type storage units 33. When the offset of a banknote to be stored in the recycling stack type storage unit 31 is larger than the limit, this banknote will be rejected.

Adhesion of Adhesive Substance

The stack type storage units 31 and the collection cassette 32 allow storage of banknotes even when the banknotes have an adhesive substance thereon. On the other hand, if a banknote with an adhesive substance thereon is stored in the tape type storage unit 33, the adhesive substance may stick to the tapes and the tape type storage units 33 may no longer be able to feed out the stored banknotes. The tape type storage units 33 therefore prohibit storage of any banknote with an adhesive substance thereon. When a banknote to be stored in the tape type storage unit 33 has an adhesive substance thereon, this banknote will be rejected. Whether the banknotes have an adhesive substance thereon is recognized by the recognition unit 23.

Other Rejection Factors

The deposit only stack type storage units 31 allow storage of banknotes having a rejection factor(s) other than the skew angle, offset, and adhesion of an adhesive substance. The recycling stack type storage unit 31 prohibits storage of reject notes. The collection cassette 32 allows storage of reject notes as it does not feed out the stored banknotes. The tape type storage unit 33 allows storage of a part of reject notes.

Centering Operation

The recycling stack type storage units 31 allow storage of banknotes even when the amount of centering of the banknotes is large. When the amount of centering is large, the centering mechanism may not be able to reliably center the banknotes with respect to the center position of the transport path. Even when banknotes are slightly offset from the center, it does not so much affect the operation of storing the banknotes in the stack type storage units 31 and feeding the banknotes out of the stack type storage units 31. The recycling stack type storage units 31 allow storage of banknotes even when the amount of centering of the banknotes is large. The recycling stack type storage units 31 prohibit storage of banknotes when the amount of centering is too large. When the amount of centering of a banknote to be stored in the recycling stack type storage units 31 is too large, this banknote will be rejected.

The deposit only stack type storage units 31 and the deposit only collection cassette 32 have no limit on the amount of centering of banknotes. The deposit only stack type storage units 31 and the deposit only collection cassette 32 allow storage of all banknotes. The tape type storage units 33 allow storage of banknotes only when the amount of centering is small. The tape type storage units 33 prohibit storage of banknotes when the amount of centering is large. When the amount of centering of a banknote to be stored in the tape type storage units 33 is large, this banknote will be rejected.

For example, in a deposit process, the storage destination of each banknote is determined based on the recognition results of the recognition unit 23. The control unit 15 determines whether the banknote can be stored in the determined storage destination, based on the determined storage destination and the conditions 500 shown in FIG. 5. When the banknote can be stored in the determined storage determination, the control unit 15 transports the banknote through the transport unit 4 and stores it in a predetermined storage unit. When the banknote cannot be stored in the determined storage determination, the control unit 15 transports the banknote to the dispense unit 22 through the transport unit 4. That is, the banknote is treated as a reject note.

The banknote handling device 1 does not determine whether a banknote should be rejected in the same way for all the storage units. Since the conditions for allowing storage of banknotes are different between the stack type storage units 31, 32 and the tape type storage units 33, the banknote handling device 1 reduces the number of reject notes.

Paper Piece Sensors on Transport Path

Figure 7:
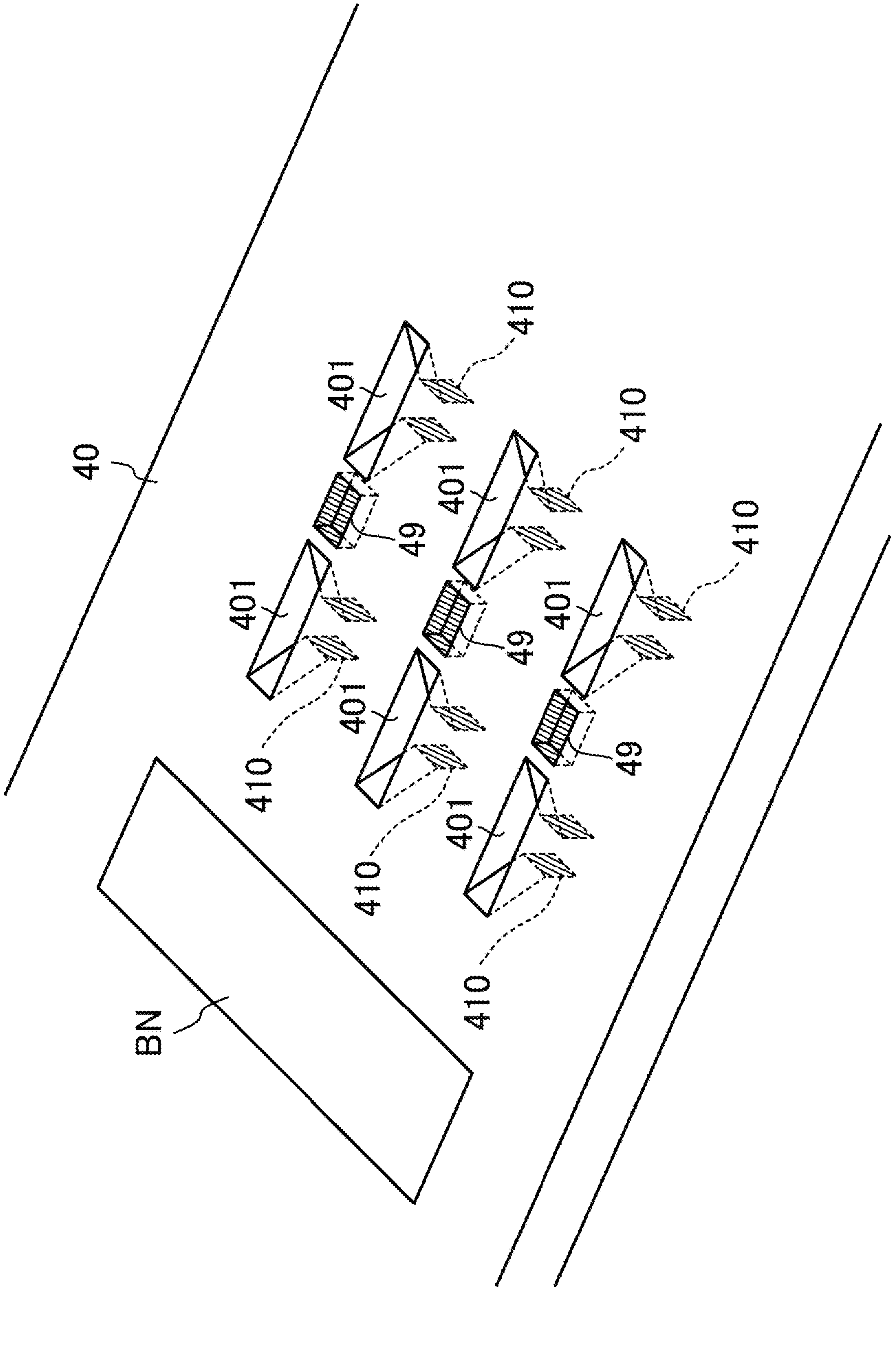
FIG. 7 is a perspective view of a part of a transport path.

Paper piece sensors 410 as shown in FIG. 7 may be disposed on the transport path 40. FIG. 7 illustrates a part of the transport path 40. Banknotes are transported in the direction from lower right to upper left in FIG. 7. As described above, the passage sensors 49 that detect passage of banknotes are disposed on the transport path 40. The passage sensors 49 are arranged at predetermined intervals in the lateral direction perpendicular to the transport direction. The passage sensors 49 detect a plurality of positions in the lateral direction of each banknote BN being transported on the transport path 40. The passage sensors 49 can detect the skew angle and the amount of offset of each banknote. For example, the passage sensors 49 may be optical sensors. More specifically, the passage sensors 49 may be reflective sensors.

The transport path 40 has openings 401 upstream and downstream of each passage sensor 49. The openings 401 have an elongated shape in the transport direction. Paper pieces or paper dust generated from a banknote being transported falls from the transport path 40 into the openings 401.

Each opening 401 has a tapered shape, wider at its upper end and narrower at its lower end. The paper piece sensor 410 is attached to each opening 401. Specifically, the paper piece sensors 410 are attached to the lower ends of the openings 401. The paper pieces etc. having fallen into the openings 401 reach the paper piece sensors 410. The paper piece sensors 410 detect passage of the paper pieces or paper dust. Although not shown in FIG. 3, the paper piece sensors 410 are connected to the control unit 15 and output detection signals to the control unit 15.

The control unit 15 performs the following control in response to the detection signal(s) from the paper piece sensor(s) 410.

(1) The control unit 15 reduces the transport speed of banknotes BN. This reduces generation of paper pieces or paper dust from the banknotes BN. Paper pieces or paper dust causes false detection of the passage sensors 49. Reducing generation of paper pieces or paper dust reduces false detection of the passage sensors 49.

(2) The control unit 15 interrupts the current process. For example, in the case where banknotes to be deposited are in poor condition and a deposit process is continued using such banknotes, a large amount of paper pieces or paper dust may be generated from the banknotes. In this case, interrupting the deposit process reduces generation of paper pieces or paper dust. The control unit 15 notifies the user of the interruption of the process via the UI unit 16 and make an alarm sound.

(3) The control unit 15 reduces the detection level of the passage sensors 49. This reduces false detection due to paper pieces or paper dust.

(4) The control unit 15 does not use the detection signals of the paper piece sensors 410. For example, when the paper piece sensors 410 continues to detect paper pieces etc. due to paper pieces or paper dust sticking to the paper piece sensors 410, the control unit 15 not using the detection signals of the paper piece sensors 410 reduces malfunction of the banknote handling device 1.

Update of Banknote Handling Device

For example, when banknotes are redesigned, a maintenance person needs to update a template file that is used to recognize banknotes by the recognition unit 23. The template file contains various kinds of information to be used for recognition of banknotes.

In some cases, it is necessary to change the storage method (control method) of each storage unit when banknotes are redesigned. For example, in the case where new banknotes have a security thread, the thickness of the new banknotes is different from that of old banknotes. Since the thickness of the banknotes changes, the maximum storage capacity of each storage unit also changes, or a specific storage unit may no longer be able to store the banknotes. When banknotes are redesigned, the maintenance person need to store the change of the storage method of each storage unit and other information in the storage unit 18 of the banknote handling device 1 to update banknote information in the storage unit 18.

As illustrated in FIG. 8, the banknote handling device 1 has a combined file 10 of a template file for recognition and banknote information for control. The banknote information in the illustrated example includes “banknote features,” “whether banknotes can be stored in tape type storage units,” “whether banknotes can be stored in mixed state,” and "maximum number of banknotes." The maintenance person does not need to have the banknote handling device 1 individually read the template file for recognition and the banknote information for control. The maintenance person can update both the template for recognition and the banknote information for control by having the banknote handling device 1 read the single file 10 illustrated in FIG. 8.

Although the update of the template and the change of the control method of the device are performed using the file shown in FIG. 8, this is illustrative only, and the update of the template and the change of the control method of the device may not be performed using the file shown in FIG. 8. The update of the template and the change of the control method may be performed individually.

The technique disclosed herein is not limited to applications to the above banknote handling device. The technique disclosed herein is applicable to sheet handling devices that handle sheets including vouchers, stock certificates, and other valuable media.

What is claimed is:

1. A medium handling device, comprising:

an upper body;

a lower body located below the upper body;

a conveyor which conveys a medium in the upper body and the lower body, and has an annular portion in the upper body; and a processing circuitry which controls operation of the conveyor, wherein the upper body has:

an inlet/outlet unit including a pair of paths consisting of an inlet path through which the medium is taken into the upper body and an outlet path through which the medium is discharged to an outside of the upper body, the inlet/outlet unit being provided to take the medium to be deposited into the upper body or to discharge the medium to be withdrawn to the outside of the upper body via only the pair of paths; and a recognition circuitry which recognizes the medium having been taken in through the inlet/outlet unit and being conveyed by the conveyor, the lower body has:

a door located at a front portion of the medium handling device;

two first storages for the medium, the first storages being opposed to each other in a vertical direction; and a second storage for the medium, the second storage being larger than each of the first storages, the conveyor includes a plurality of concaves each having a rectangular shape, the plurality of concaves are arranged in a grid pattern along a first direction and a second direction perpendicular to the first direction, the conveyor conveys the medium in the first direction, and in the second direction, a first concave of the plurality of concaves is disposed at a center of the conveyor, a second concave of the plurality of concaves is disposed between the center of the conveyor and a left end of the conveyor, and a third concave of the plurality of concaves is disposed between the center of the conveyor and a right end of the conveyor.

2. The medium handling device of claim 1, wherein the recognition circuitry obtains a serial number of the medium having been taken in through the inlet/outlet unit in a direct deposit process.

3. The medium handling device of claim 1, wherein the second storage is disposed adjacent to a wall surface of the lower body in a front-rear direction, and stores the medium recognized as a reject medium by the recognition circuitry.

4. The medium handling device of claim 1, wherein each of the first storages and the second storage stores a plurality of media in a layered state.

5. The medium handling device of claim 1, wherein the lower body has a safe structured by only a single closed space, the safe accommodates the first storages and the second storage, and the first storages and the second storage form six medium storage compartments inside the single closed space, to store media of different denominations.

6. The medium handling device of claim 1, wherein the recognition circuitry obtains a serial number of the medium.

7. The medium handling device of claim 1, further comprising:

a sensor provided to the conveyor, wherein the sensor is disposed between two concaves, of the plurality concaves, in the first direction.

8. The medium handling device of claim 7, wherein the sensor and the two concaves are arranged in a direction parallel to the first direction.

9. The medium handling device of claim 7, wherein the sensor includes a plurality of sensors, and in the second direction, a first sensor of the plurality of sensors is disposed at a position corresponding to the first concave, a second sensor of the plurality of sensors is disposed at a position corresponding to the second concave, and a third sensor of the plurality of sensors is disposed at a position corresponding to the third concave.

* * * * *